(12) United States Patent
Ejakov (10) Patent No.: US 10,018,220 B2
(45) Date of Patent: Jul. 10, 2018

(54) CONNECTING ROD FOR AN INTERNAL COMBUSTION ENGINE

(71) Applicant: Ford Global Technologies, LLC, Dearborn, MI (US)

(72) Inventor: Mikhail Ejakov, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 147 days.

(21) Appl. No.: 15/133,638

(22) Filed: Apr. 20, 2016

(65) Prior Publication Data

US 2017/0307005 A1 Oct. 26, 2017

(51) Int. Cl.
*F16C 7/02* (2006.01)
*F16C 9/04* (2006.01)

(52) U.S. Cl.
CPC .............. *F16C 7/023* (2013.01); *F16C 9/04* (2013.01)

(58) Field of Classification Search
CPC .................................. F16C 7/023; F16C 9/04
USPC ....................................................... 123/197.3
See application file for complete search history.

(56) References Cited

U.S. PATENT DOCUMENTS

| 6,146,471 | A | 11/2000 | Hartl et al. | |
|---|---|---|---|---|
| 8,746,204 | B2 | 6/2014 | Hofbauer | |
| 8,979,379 | B1 | 3/2015 | Kawashima et al. | |
| 9,004,767 | B2 | 4/2015 | Ishigo et al. | |
| 9,080,604 | B2 | 7/2015 | Rossmanith et al. | |
| 2002/0126924 | A1* | 9/2002 | Okamoto | F16C 9/04 384/276 |
| 2008/0078353 | A1* | 4/2008 | Hayama | F16C 7/023 123/197.3 |
| 2010/0300244 | A1* | 12/2010 | Gibby | F16C 9/04 74/579 R |
| 2013/0247879 | A1* | 9/2013 | von Mayenburg | F02B 75/045 123/48 B |

FOREIGN PATENT DOCUMENTS

DE          10130253 B4     8/2004

* cited by examiner

*Primary Examiner* — Joseph Dallo
*Assistant Examiner* — Yi-Kai Wang
(74) *Attorney, Agent, or Firm* — Brooks Kushman P.C.; Julia Voutyras (57) ABSTRACT

An engine has a connecting rod with a big end dimensioned such that a lower face height is a function of an upper face height, a face-to-face width, and a strap height and width. First and second bearing shells are received by the big end under a specified clamp load to form a convex axial profile in response to the big end dimensions, and a crankshaft crank pin interfaces with the convex axial profile. A method of assembling a connecting rod includes inserting upper and lower bearing shells into a big end having a lower face height as a function of an upper face height, a face-to-face width, and a strap height and width, where each shell has a free state with a straight axial profile and uniform cross-section, and fastening a cap at a specified load to form a convex axial profile of the upper and lower bearing shells.

19 Claims, 5 Drawing Sheets

CONNECTING ROD FOR AN INTERNAL COMBUSTION ENGINE

TECHNICAL FIELD

Various embodiments relate to a connecting rod for an internal combustion engine.

BACKGROUND

A connecting rod or a conrod may be used to connect a piston to a crankshaft in an internal combustion engine to convert translational movement of the piston to rotational movement of the crankshaft. A bearing is provided between the connecting rod and the crankshaft, and the bearing has a profile surface that interfaces with a surface of the crankshaft. The profile surface of the bearing may impact the bearing performance and function. Presently, the profile surface is controlled via an expensive and time-consuming machining process of the crank pin journal and/or the bearing shell profile.

SUMMARY

In an embodiment, a method of assembling a connecting rod is provided. Upper and lower bearing shells are inserted into a big end having a lower face height as a function of an upper face height, a face-to-face width, and a strap height and width, each shell having a free state with a straight axial profile and uniform cross-section. A cap is fastened at a specified load to form a convex axial profile of the upper and lower bearing shells.

In another embodiment, a connecting rod for an engine has a big end connected to a small end via a beam. The big end defines a bore and having an upper portion and a lower portion provided by a cap. The upper portion has a shank extending from the beam, with the shank positioned between first and second upper faces adjacent to a periphery of an upper portion of the bore. The cap has a strap positioned between first and second lower faces adjacent to a periphery of a lower portion of the bore. The big end has a specified cross-sectional profile with a lower face height being a function of an upper face height, a lower face-to-face width, a strap height, and a strap width. An upper bearing shell is received by the upper portion of the bore, and a lower bearing shell received by the lower portion of the bore. First and second fasteners connect the cap to the upper portion of the big end at a specified load. The specified cross-sectional profile of the big end is configured to deform each bearing shell from a freeform uniform cross-section to a convex axial profile cross-section in response to securing the cap to the upper portion of the big end with a predetermined load, with the convex axial profile cross-section having an inner face with a central region being at least one micrometer higher than edge regions of the inner face.

In yet another embodiment, an engine has a connecting rod with a big end dimensioned such that a lower face height is a function of an upper face height, a face-to-face width, and a strap height and width. First and second bearing shells are received by the big end under a specified clamp load to form a convex axial profile in response to the big end dimensions. A crankshaft has a crank pin interfacing with the convex axial profile.

DETAILED DESCRIPTION

As required, detailed embodiments of the present disclosure are provided herein; however, it is to be understood that the disclosed embodiments are merely exemplary of and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
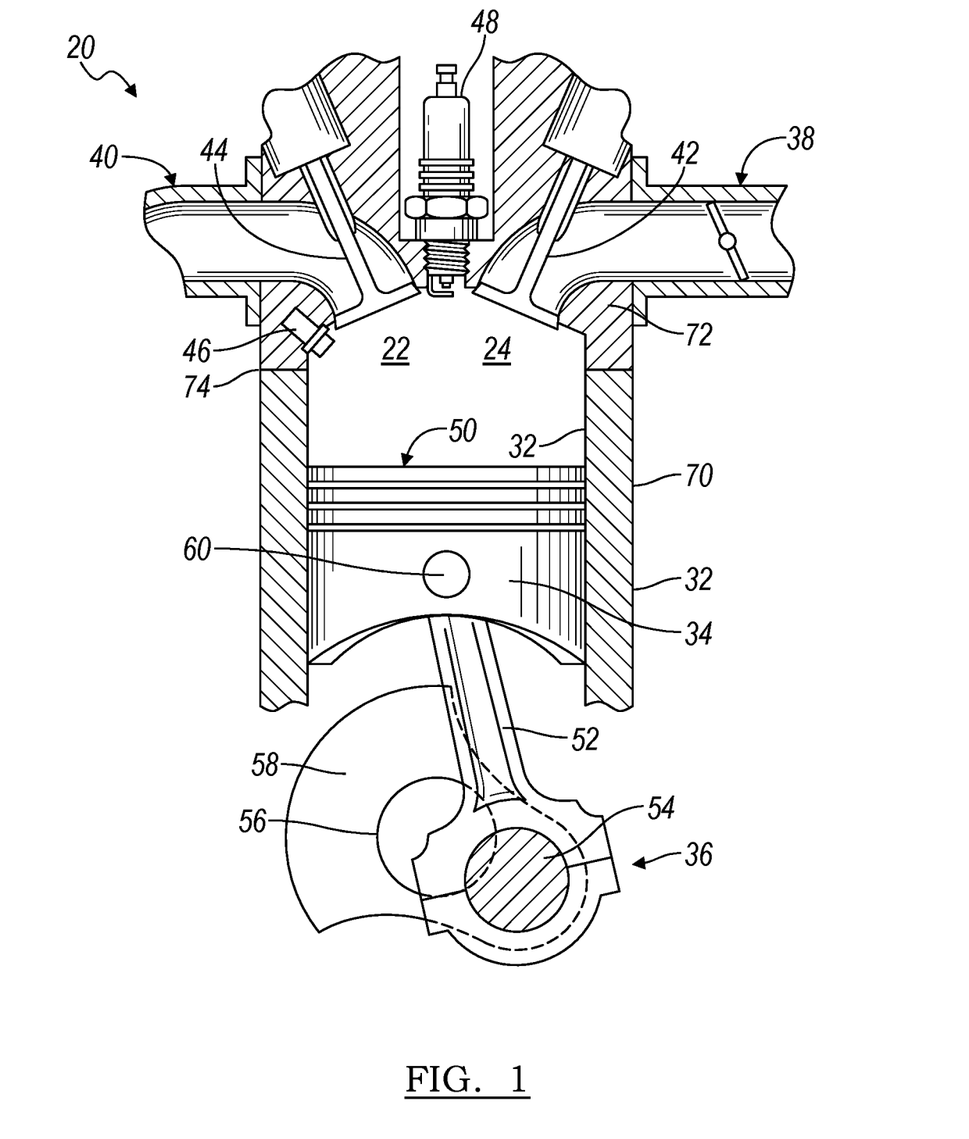
FIG. 1 illustrates a schematic of an engine configured to implement the disclosed embodiments.

FIG. 1 illustrates a schematic of an internal combustion engine 20. The engine 20 has a plurality of cylinders 22, and one cylinder is illustrated. The engine 20 may include multiple cylinders arranged in various manners, including an inline configuration and a V-configuration. The engine 20 has a combustion chamber 24 associated with each cylinder 22. The cylinder 22 is formed by cylinder walls 32 and piston assembly 34. The piston assembly 34 is connected to a crankshaft 36. The combustion chamber 24 is in fluid communication with the intake manifold 38 and the exhaust manifold 40. An intake valve 42 controls flow from the intake manifold 38 into the combustion chamber 24. An exhaust valve 44 controls flow from the combustion chamber 24 to the exhaust manifold 40.

A fuel injector 46 delivers fuel from a fuel system directly into the combustion chamber 24 such that the engine is a direct injection engine. A low pressure or high pressure fuel injection system may be used with the engine 20, or a port injection system may be used in other examples. An ignition system includes a spark plug 48 that is controlled to provide energy in the form of a spark to ignite a fuel air mixture in the combustion chamber 24. In other embodiments, other fuel delivery systems and ignition systems or techniques may be used, including compression ignition. The intake and exhaust valves 42, 44, the injector 46, and the spark plug 48 may be operated in various ways as is known in the art to control the engine operation.

The engine 20 includes a controller and various sensors configured to provide signals to the controller for use in controlling the air and fuel delivery to the engine, the ignition timing, the power and torque output from the engine, and the like. Engine sensors may include, but are not limited to, an oxygen sensor in the exhaust manifold 40, an engine coolant temperature sensor, an accelerator pedal position sensor, an engine manifold pressure (MAP) sensor, an engine position sensor for crankshaft position, an air mass sensor in the intake manifold 38, a throttle position sensor, and the like.

In some embodiments, the engine 20 is used as the sole prime mover in a vehicle, such as a conventional vehicle, or a stop-start vehicle. In other embodiments, the engine may be used in a hybrid vehicle where an additional prime mover, such as an electric machine, is available to provide additional power to propel the vehicle.

Each cylinder 22 operates under a four-stroke cycle including an intake stroke, a compression stroke, an ignition stroke, and an exhaust stroke. In other examples, the engine may operate using a two-stroke cycle. During the intake stroke, the intake valve 42 opens and the exhaust valve 44 closes while the piston assembly 34 moves from the top of the cylinder 22 to the bottom of the cylinder 22 to introduce air from the intake manifold to the combustion chamber. The piston assembly 34 position at the top of the cylinder 22 is generally known as top dead center (TDC). The piston assembly 34 position at the bottom of the cylinder is generally known as bottom dead center (BDC).

During the compression stroke, the intake and exhaust valves 42, 44 are closed. The piston 34 moves from the bottom towards the top of the cylinder 22 to compress the air within the combustion chamber 24.

Fuel is then introduced into the combustion chamber 24 and ignited. In the engine 20 shown, the fuel is injected into the chamber 24 and is then ignited using spark plug 48. In other examples, the fuel may ignite via a compression ignition process.

During the expansion stroke, the ignited fuel air mixture in the combustion chamber 24 expands, thereby causing the piston 34 to move from the top of the cylinder 22 to the bottom of the cylinder 22. The movement of the piston assembly 34 causes a corresponding movement in crankshaft 36 and provides for a mechanical torque output from the engine 20. The combustion process causing the expansion stroke results in loads and forces on the engine 20. A force on the engine caused by the combustion event in the chamber 24 imparts a force on the face 50 of the piston 34, and at least a portion of the force travels down the connecting rod 52 to the crankshaft 36.

The connecting rod 52 connects to a crank pin 54 or crank pin journal of the crankshaft assembly 36. The crank pin 54 is connected to the crankshaft 56 or main bearing journal of the crankshaft assembly 36 via a web 58 such that the crank pin 54 is offset from that of the crankshaft 56. The crankshaft assembly may also include counterweights extending from the web structure 58 to rotationally balance the crankshaft assembly. The main journal bearing 56 is supported for rotation by main bearings, for example, positioned within the engine block or crankcase. The opposed end of the connecting rod 52 connects to the piston 34, for example, via a piston pin 60 or wrist pin and associated bearing.

During the exhaust stroke, the intake valve 42 remains closed, and the exhaust valve 44 opens. The piston assembly 34 moves from the bottom of the cylinder to the top of the cylinder 22 to remove the exhaust gases and combustion products from the combustion chamber 24 by reducing the volume of the chamber 24. The exhaust gases flow from the combustion cylinder 22 to the exhaust manifold 40 and to an aftertreatment system such as a catalytic converter.

The intake and exhaust valve 42, 44 positions and timing, as well as the fuel injection timing and ignition timing may be controlled and/or varied for the various engine strokes and for various engine operating conditions and loads.

The engine 20 has a cylinder block 70 that forms the cylinders 22. A cylinder head 72 is connected to the block 70. The head 72 encloses the combustion chamber 24 and also supports the various valves 42, 44, and intake and exhaust systems 38, 40. A head gasket or another sealing member may be positioned between the block 70 and the head 72 to seal the combustion chamber 24.

Figure 2:
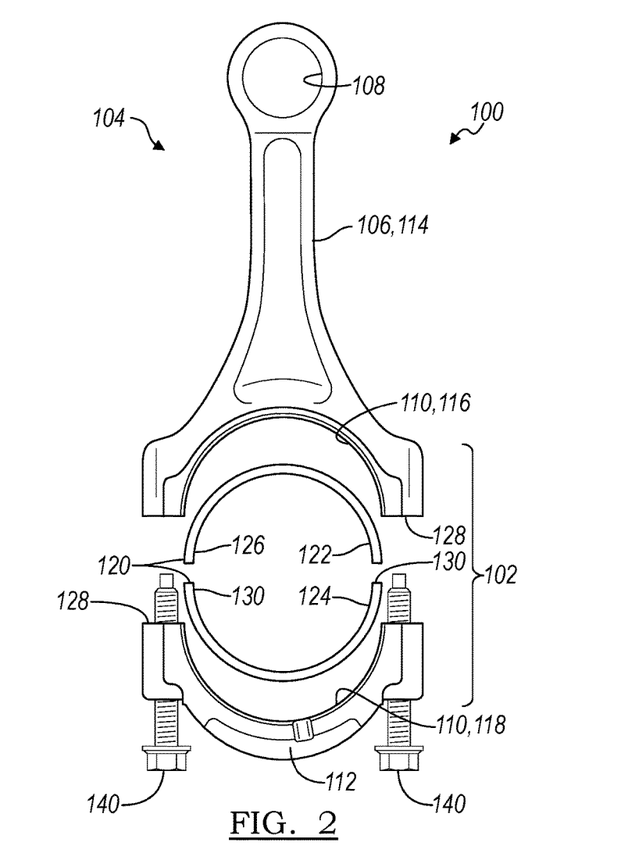
FIG. 2 illustrates an exploded view of a connecting rod according to an embodiment.

FIG. 2 illustrates an exploded view of a connecting rod 100. In one example, connecting rod 100 is used as connecting rod 52 in engine 20.

The connecting rod 100 has a big end 102 that connects to the crank pin or crank journal 54, and an opposed small end 104 that connects to the piston pin or wrist pin 60. The big end 102 and small end 104 are connected by a rod section 106 or beam 106. The small end 104 defines a bore 108 that is sized to receive the wrist pin 60 and any associated bearings. The big end 102 defines a bore 110 that is sized to receive the crank pin 54 and an associated bearing.

The connecting rod 100 may be formed as a single unitary component, for example, from a forging process. After the connecting rod 100 is formed, the big end 102 may be split or fractured, as shown, to provide a bearing cap 112 that connects to the body 114 of the connecting rod or the remainder 114 of the connecting rod. The big end 102 and the bore 110 are therefore split into two separate sections when the connecting rod 100 is disassembled, with a first portion or upper portion 116 of the bore 110 formed by the main body 114, and a second portion or lower portion 118 of the bore 110 formed by the bearing cap 112.

The cap 112 is connected to the main body 114 via fasteners 140. For example, each fastener 140 may be a bolt or a nut-and-bolt assembly. The big end 102 of the connecting rod defines bores, for example, threaded bores, through bores, or blind bores, to receive the fasteners 140. The cap 112 and the main body 114 each define a portion of each of the bores to receive the fasteners 140. The fasteners 140 are arranged on opposed sides of the bore 110.

A bearing assembly 120 is positioned within the bore 110 of the big end 102 of the connecting rod. The bearing assembly 120 has an upper shell 122 and a lower shell 124. The upper shell 122 is received by the upper portion 116 of the bore 110. The upper portion 116 of the bore 110 defines a surface with an associated radius of curvature or radius, and the surface has a profile that is shaped as a section of a circle, for example, as a semi-circle. The upper shell 122 of the bearing assembly 120 is shaped to have an associated radius of curvature or radius such that a profile of the upper shell 122 is also a section of a circle, for example, a semi-circle. The radius of curvature of the upper shell 122 is greater than a radius of curvature of the upper portion 116 of the bore 110. The end sections 126 of the upper shell 122 therefore extend slightly past the ends of the upper portion 116 of the bore, or extend slightly past the part line 128 or fracture line for the big end 102.

The lower portion 118 of the bore 110 defines a surface with an associated radius of curvature or radius, and the surface has a profile that is shaped as a section of a circle, for example, as a semi-circle. The radius of curvature or radius of the lower portion 118 of the bore is identical to the upper portion 116 of the bore. The lower shell 124 of the bearing assembly 120 is shaped to have an associated radius of curvature or radius such that a profile of the lower shell 124 is also a section of a circle, for example, a semi-circle. In one example, the radius of curvature or radius of the lower shell 124 is identical to the upper shell 122. The radius of curvature of the lower shell 124 is greater than the radius of curvature of the lower portion 118 of the bore 110. The end sections 130 of the lower shell 124 therefore extend slightly past the ends of the lower portion of the bore, or extend slightly past the part line 128 or fracture line for the cap.

To form the connecting rod 100, a rod preform is provided as an integral unit or as a single piece, for example, in a forging process, or the like. The rod preform may be machined at this point, for example, to provide the fastener 140 bores, and/or to machine the wall surface of the bore 108 to an associated specification. The rod preform is then split to provide the main body 114 and the cap 112, for example, in a fracture splitting process along a fracture line 128. After splitting, the cap 112 is connected to the main body 114 using the fasteners 140 to a specified torque rating on the fasteners. The bore 110 is then machined to an associated specification to form the surfaces of the upper and lower portions 116, 118 of the bore 110 wall, for example, using a line bore process. Machining the bore 110 after the splitting process provides for a more controlled and uniform bore wall surface.

After machining the bore 110, the fasteners 140 are then removed or loosened such that the cap 112 moves apart from the main body 114 of the connecting rod. The upper and lower bearing shells 122, 124 are inserted into the upper and lower portions 116, 118 of the bore 110, respectively. The ends 126, 130 of each of the upper and lower shells 122, 124 extend past the fracture or part line 128, or extend or protrude past the ends of the upper and lower portions 116, 118 of the bore when inserted. The cap 112 is then reconnected to the main body 114 using the fasteners 140 to a specified torque rating on the fasteners, which in turn causes the upper and lower portions 116, 118 of the bore 110 to contact the respective bearing shell 122, 124, and causes the bearing assembly 120 to be compressed radially by the bore wall 110. The protruding ends 126, 130 of the upper and lower bearing shells 122, 124 contact one another, and may be deformed in a bearing crush.

The bearing assembly 120 is therefore placed under stress by the surrounding bore wall 110. In an installed state, the bearing assembly 120 is under a hoop stress or circumferential stress in a tangential direction due to the radial forces or pressure exerted on the bearing assembly 120 by the surrounding connecting rod 100 structure. The bearing assembly 120 is also under an axial stress and a radial stress; however, these are small compared to the hoop stress based on the bearing assembly 120 being a thin walled, open ended structure. The hoop stress acts to locate and retain the bearing shells 122, 124 within the bore 110 of the connecting rod.

Figure 3A:
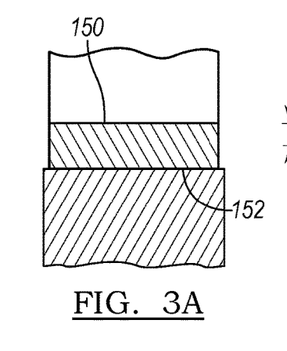
FIGS. 3A, 3B, and 3C illustrate three axial profiles for a surface of a bearing shell in a connecting rod.
Figure 3B:
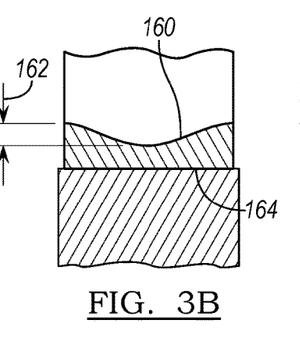
Figure 3C:
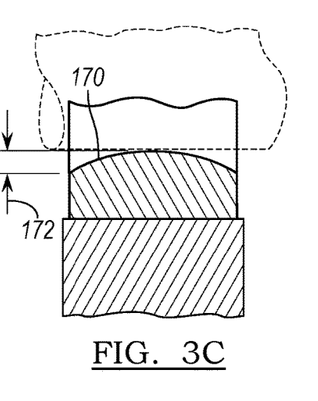

FIGS. 3A-3C illustrate three examples of axial profiles for inner diameters of bearing shells for a bearing assembly. The axial profile is taken along an axis of the bearing shell that is into the page of FIGS. 3A-3C. FIG. 3A illustrates a first axial profile 150 for the bearing shell that is flat or straight. In one example, the straight axial profile is provided by a bearing shell that has a uniform cross-sectional profile, e.g. a rectangle that is a constant width and thickness along the length of the bearing shell. The flat or straight axial profile on the face of the bearing shell that interfaces with the crank pin journal has a surface with less than one micrometer of variation in the axial direction. The flat profile 150 in FIG. 3A represents a freeform bearing shell profile when the bearing shell is unloaded or in a free state, or before the bearing shell is inserted into and compressed by the connecting rod and bore wall 152. Note that the bearing shell in FIG. 3A has a uniform cross section or uniform thickness.

When the bearing assembly 120 is inserted into the bore 110 of the connecting rod, and the fasteners 140 are tightened to a specified torque rating, the bearing assembly 120 is under a hoop stress as it is compressed by the bore 110 of the connecting rod. The bearing assembly 120 undergoes bearing crush and is placed under radial compressive load to deform the bearing shells.

The axial profile of the bearing assembly 120 when in use in the connecting rod 100 is directly linked to the bearing performance and function. Previously, the axial profile of the bearing assembly has been uncontrolled, or has been controlled using a precision machining process on the surface or journal of the crank pin beyond the standard machining to form a cylindrical surface for the journal of the crank pin. Any machining conducting on the crank pin journal is a precision machining process, and as such is both time consuming and costly. In some cases, controlling the crank pin journal axial profile is not sufficient and an additional axial profile must be introduced into the bearing shell, for example, by providing a bearing shell with non-flat axial profile before the bearing shell undergoes load or by machining the bearing shells after assembly into the connecting rod.

A concave axial profile 160 is illustrated in FIG. 3B. This concave axial profile 160 is a common resulting profile in a conventional connecting rod system without precision machining of the journal or machining the bearing shell axial profile before insertion into the connecting rod. The concave axial profile has a height 162 where the central region of the axial profile is recessed or below the edges of the bearing shell, and is caused by the deformation of the bearing shell based on hoop stress and strain imparted from the bore wall 164. The concave axial profile may be defined as having a central region that is recessed by more than one micrometer from the edges of the bearing shell, and has a concave axial curvature. Note that bore wall 164 represents a bore wall according to a conventional connecting rod.

The flat or straight axial profile 150 in FIG. 3A may be provided as a final axial profile for the bearing assembly under load, for example, after a precision machining process, and has a targeted circumferential profile (eccentricity, crush relief etc.) In other example, the flat axial profile 150 may be provided using a connecting rod as described below according to the present disclosure, and without a post-assembly machining process.

A convex axial profile 170 is illustrated in FIG. 3C. The convex axial profile 170 is a desired axial profile for the bearing assembly 120 under load as the crank pin journal bends under load during engine operation which may result in contact along the edges of the bearing shells for a flat or concave profile as shown in FIGS. 3A and 3B. The convex axial profile 170 of FIG. 3C provides a more robust shape for the bearing assembly 120 as it allows for the bending of the crank pin 54 and its journal surface without loading, friction, or wear along the edges of the bearing shells. The flat or straight axial profile 170 in FIG. 3A may be provided as a final axial profile for the bearing assembly 120 under load, for example, after a precision machining process, and has a targeted circumferential profile (eccentricity, crush relief etc.) In other example, the convex axial profile 170 is provided using a connecting rod 100 as described below according to the present disclosure, and without a post-assembly machining process on the crank pin journal surface and/or the bearing shells. The height 172 of the axial profile 170 is defined as a distance that the central region of the axial profile 170 rises above the edges of the bearing shell. The convex axial profile may be defined as having a central region that rises above the edges of the bearing shell by more than one micrometer and has a convex axial curvature. In further examples the height 172 may be defined as being in a range of one to three micrometers.

Figure 4:
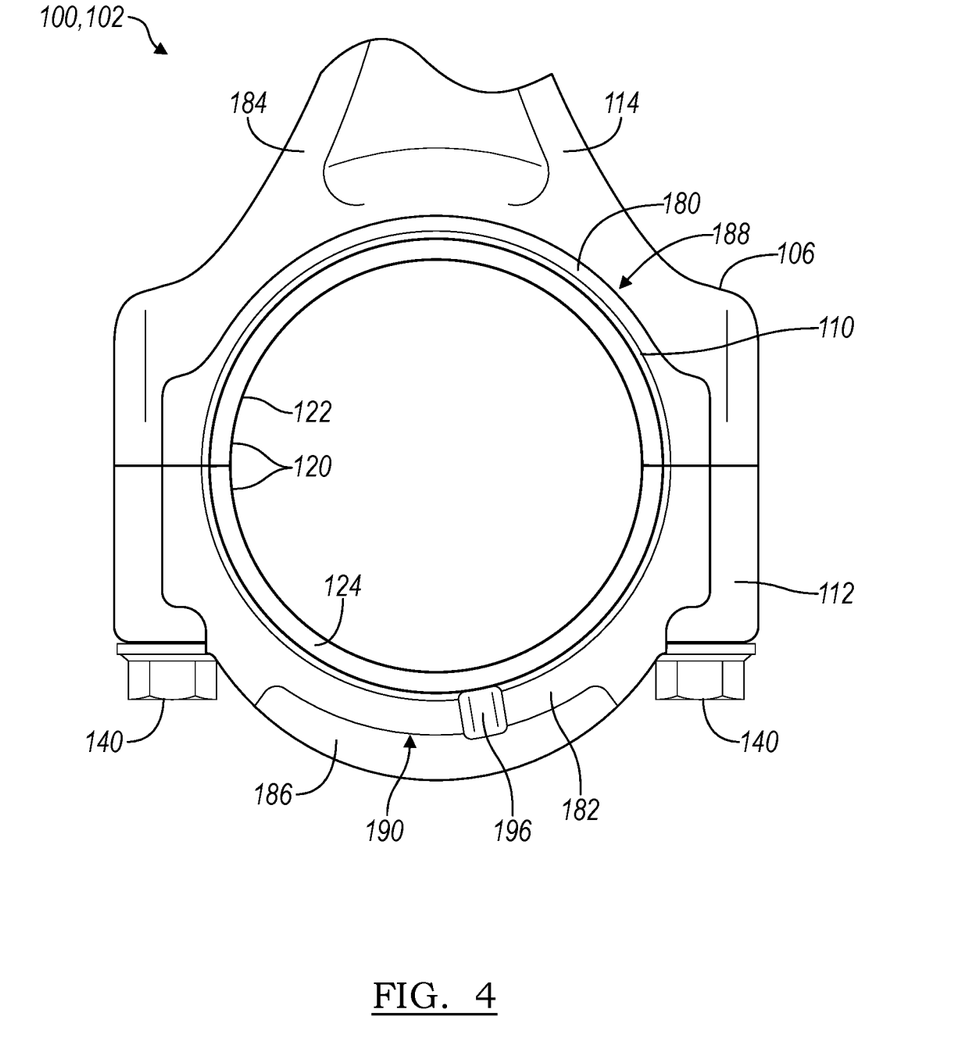
FIG. 4 illustrates a partial front view of the assembled connecting rod of FIG. 2.
Figure 5:
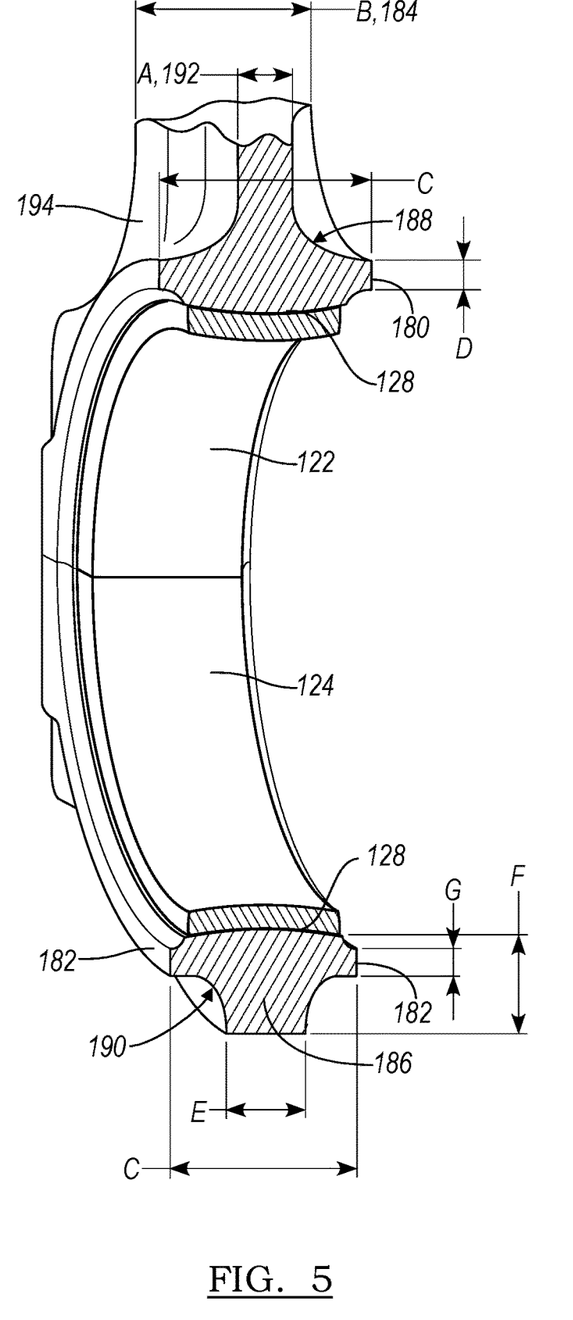
FIG. 5 illustrates a partial sectional view of the assembled connecting rod of FIG. 2.
Figure 6:
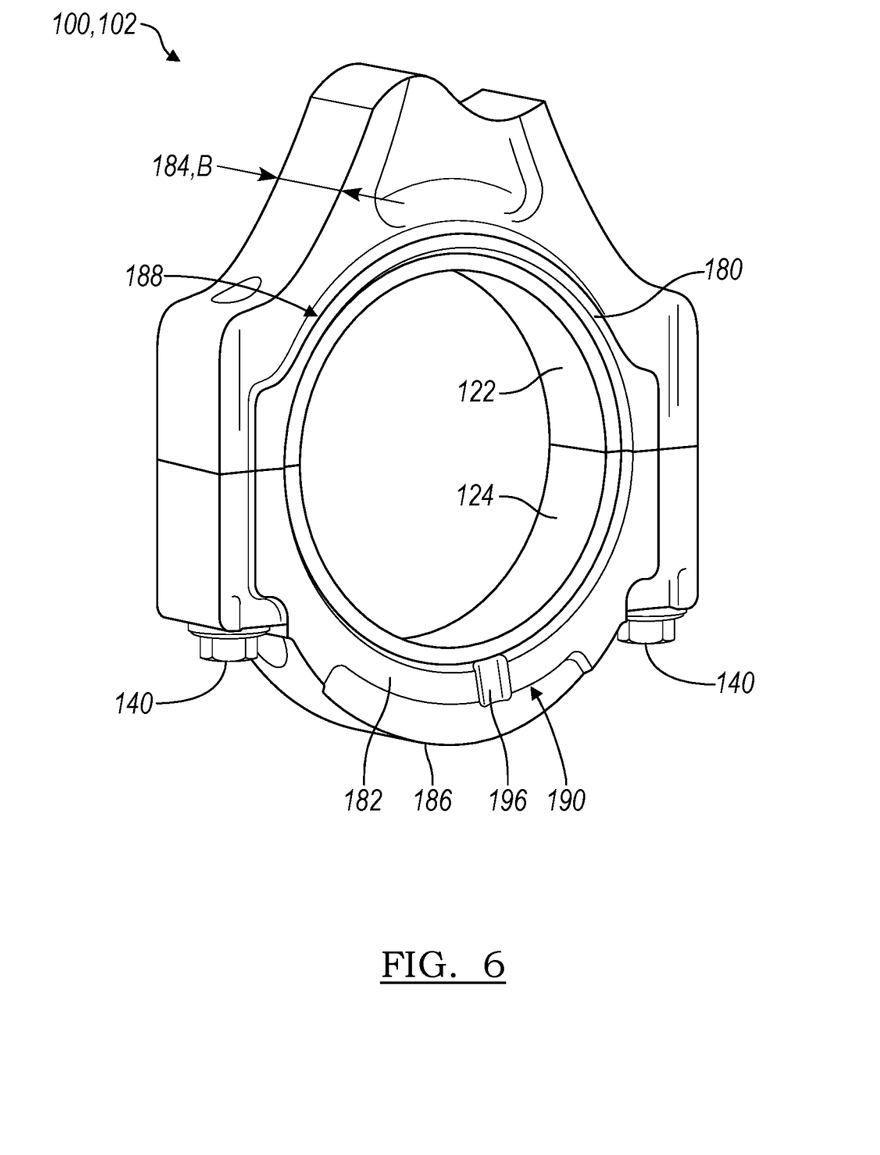
FIG. 6 illustrates a partial perspective view of the assembled connecting rod of FIG. 2.

FIGS. 4-6 illustrate partial views of a big end 102 of a connecting rod 100 and a bearing assembly 120 according to the present disclosure. Elements that are the same or similar to those shown in FIG. 2 are given the same reference number. In one example, the connecting rod may be the connecting rod 100 for use in the engine 20. The plan view of the connecting rod 100 as shown in FIG. 4 may be associated with both sides of the connecting rod, such that shape of the connecting rod on either side is identical. In some examples, specific details of the connecting rod, for example, the lubricant passages, may be present on only one side, or may be located differently on each side.

The structure of the connecting rod 100 itself is controlled to specified dimensions based on functions or relationships between various features of the connecting rod such that the big end 102 has a specified shape and the bearing shells 122, 124 have a predetermined axial profile 170 under a clamp load or specified load when the connecting rod is assembled and the fasteners are tightened. The overall dimensions of the connecting rod itself are controlled such that the convex axial profile 170 of the bearing shells 122, 124 is provided via compression of the bearing shells by the surrounding structure of the connecting rod 100, using only a line bore process for the bore wall 110 and bearing shells 122, 124 having flat or straight axial profiles and a uniform thickness before insertion into the connecting rod and in a free state. This eliminates any precision machining of the journal or of the bearing shell axial profiles.

The connecting rod 100 and bearing assembly 120 in FIGS. 4-6 has the overall structure, shape, and dimensions controlled to result in a convex axial profile 170 for the bearing shells 122, 124 as shown in FIG. 3C, when using bearing shells 122, 124 with a straight axial profile, such as that illustrated in FIG. 3A in an unloaded state.

A clamp load is created about the bearing shells 122, 124 by tightening the fasteners 140 to provide bearing crush. During the bearing crush, the bearing shells 122, 124 deform based on the contact pressure or forces between the bearing shells 122, 124 and surrounding connecting rod structure. The main body 114 and the cap 112 of the connecting rod 100 also have small deformations due to bearing crush. The deformations of bearing shells 122, 124, the main body 114 of the connecting rod, and the cap 112 of the connecting rod lead to stain energy within these components. The strain energy along with the bolt clamp load acts to retain or hold the bearing shells 122, 124 in place within the bore 110 of the connecting rod. The force equilibrium of the strain energies of the connecting rod 100 and the bearing shells 122, 124 deform the shells such that there is a non-uniformity in shape of the bearing shells 122, 124 and the convex profile 170 results. Note that each bearing shell 122, 124 used in the present disclosure has a constant thickness and a flat or straight axial profile 150 before assembly into the connecting rod and in an unloaded or free state, an example of which is illustrated in FIG. 3A.

The connecting rod 100 has various features that are controlled in size and shape such that when the bearing shells 122, 124 are crushed and the connecting rod 100 and the bearing shells 122, 124 are deformed, the final deformed shape of inner diameter of the bearing shells has the desired convex axial profile 170, or barrel shaped profile. The connecting rod 100 according to the present disclosure achieves the desired convex axial profile 170 of the bearing shells 122, 124 via shape features of the connecting rod 100 structure without any precision machining of the bearing shell 122, 124 surfaces and/or the crankshaft journal surfaces. The connecting rod 100 shape features are specifically defined in the design of the big end 102 shape and are formed during the forging process or other connecting rod formation process or via rough machining, and do not require any special or additional machining or manufacturing processes for the connecting rod 100, thereby providing a more robust bearing system 120 for the connecting rod 100 and reducing or eliminating additional machining and manufacturing processes, time, and costs.

The dimensions of the connecting rod thrust surfaces 180, 182 and the main body shank 184 and strap 186 of the cap are controlled relative to one another to control the final axial profile 170 of the bearing assembly 120. The connecting rod 100 structure features that control the bearing shell 122, 124 deformations are shown and described below with respect to FIGS. 4-6, and include dimensions of the connecting rod thrust surfaces 180, 182, and the fillet radii 188, 190 between the thrust surfaces and the associated connecting rod shank 184 and cap strap 186 dimensions.

The beam 106 of the connecting rod has an I-beam structure, with a narrow central member 192 with an axial width A, and two outer cross members 194 that extend from the central member 192. The shank 184 or upper portion 116 of the big end 102 of the connecting rod extends from the beam 106 and has an axial width B generally equal to the width B of the outer cross member 194 of the beam. An upper face 180 or upper thrust surface 180 is provided on each side of the shank 184 of the big end 102 and surrounds a periphery of the upper region of the bore 110. An axial distance C or the axial width C between opposed upper faces 180 of the connecting rod is greater than the axial width B of the shank 184 of the big end. A radius 188 or fillet 188 is provided between the shank 184 and the upper face 180 to provide for stress distribution and the necessary draft angles for forming the connecting rod 100. The upper face 180 has a face width D that extends radially outwards from the bore wall 110.

The cap 112 of the connecting rod has a strap 186. The strap 186 structure has an axial width E and has a height F that is defined as the distance between the lower bore wall 110 and the outer surface of the strap. A lower face 182 or lower thrust surface 182 is provided on each side of the cap 112 and surrounds a periphery of the lower region of the bore. The distance C between opposed lower faces 182 of the connecting rod corresponds to the distance C between opposed upper faces 180, such that the upper and lower faces 180, 182 on each side are co-planar with each other. An axial distance C or the axial width C between opposed lower faces of the connecting rod is greater than the axial width E of the strap of the cap. A radius 190 or fillet is provided between the strap 186 and the lower face 182 to provide for stress distribution and the necessary draft angles for forming the connecting rod. The lower face 182 has a face width G that extends radially outwards from the bore wall.

A passage 196 or recess for flow of lubricant may be provided on one of the upper or lower faces 180, 182 on at least one side of the connecting rod.

The following relationships are provided for the various dimensions of the connecting rod 100 to provide the convex axial profile 170 of the bearing assembly under load according to the present disclosure.

The relationship between the lower face 182 height (G) and the strap 186 axial width (E) is: G<E.

The relationship between the strap 186 axial width (E) and the face-to-face axial width (C) is: 0.2 C<E<0.6 C.

The relationship between the lower face 182 height (G) and the face-to-face axial width (C) is: 0.2 C<G<0.6 C. Note that therefore, the relationship between the lower face 182 height (G), the strap 186 axial width (E), and the face-to-face axial width (C) is: 0.2 C<G<E<0.6 C.

The relationship between the lower face 182 height (G) and the strap 186 height (F) is: 0.2 F<G<0.5 F.

The relationship between the upper face 180 height (D) and the lower face 182 height (G) is: D<0.8 G.

According to one example, the connecting rod 100 uses a bearing assembly 120 with bearing shells 122, 124 having a straight axial profile 150 and a uniform thickness when in an unloaded pre-assembly state as shown in FIG. 3A and is shaped according to the relationships above. The bearing shells 122, 124 have an axial width of approximately 20 millimeters and a thickness of approximately 1.5 to 2.5 millimeters. The fasteners 140 are tightened to a predetermined torque rating, thereby introducing clamp loads, strain, and deformation and bearing crush of the connecting rod 100 and the bearing assembly 120. As the fasteners 140 are tightened, the surfaces 128 on the connecting rod 100 are deformed axially as shown in FIG. 5 to have a convex profile, which in turn deforms the bearing shells 122, 124 to the desired convex axial profile as illustrated. Before deformation, the surfaces 128 have a straight or linear axial profile due to the line bore process used in making the connecting rod assembly 100.

The resulting bearing assembly 120 or shell 122, 124 profile is a convex axial profile 170 having a height on the order of one micrometer or more, although heights ranging between zero and three micrometers, and between one and three micrometers are also contemplated.

Of course, in other examples, the connecting rod 100 and bearing shells 122, 124 may be otherwise dimensioned, for example, for use in various engines, while remaining under the spirit and scope of the present disclosure to provide the convex axial profile 170 of the bearing assembly 120 via the dimensional relationships of the structure of the connecting rod 100 and the strain developed by tightening the fasteners 140 to the predetermined torque level.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method of assembling a connecting rod comprising:
    inserting upper and lower bearing shells into a big end having a lower face height as a function of an upper face height, a face-to-face width, and a strap height and width; and
    fastening a cap at a specified load thereby deforming to form a convex axial profile of the upper and lower bearing shells to a convex axial profile from a free state with a straight axial profile and uniform cross-section.

2. The method of claim 1 wherein the function between the lower face height (G), the strap width ©, and the face-to-face width © is: 0.2 C<G<E<0.6 C;
    wherein the function between the lower face height (G) and the upper face height (D) is: D<0.8 G; and
    wherein the function between the lower face height (G) and the strap height (F) is: 0.2 F<G<0.5 F.

3. The method of claim 1 wherein the function between the lower face height (G), the strap width ©, and the face-to-face width © is: 0.2 C<G<E<0.6 C.

4. The method of claim 1 wherein the function between the lower face height (G) and the upper face height (D) is: D<0.8 G.

5. The method of claim 1 wherein the function between the lower face height (G) and the strap height (F) is: 0.2 F<G<0.5 F.

6. The method of claim 1 further comprising: splitting the big end to form the cap and a remainder of the connecting rod; and fastening the cap to the remainder of the connecting rod and line boring the big end.

7. The method of claim 6 further comprising separating the cap from the remainder of the connecting rod;
    wherein the steps are performed sequentially as: forming the connecting rod, splitting the big end, fastening the cap and line boring the big end, separating the cap, inserting the upper and lower bearing shells, and fastening the cap at the specified load.

8. The method of claim 1 further comprising connecting the big end of the connecting rod about a crank pin of a crankshaft, the crank pin formed as a cylindrical journal.

9. The method of claim 1 wherein a center of the convex axial profile is deformed to a height up to three micrometers as caused by the specified load and the function.

10. A connecting rod for an engine comprising:
    a big end connected to a small end via a beam, the big end defining a bore and having an upper portion and a lower portion provided by a cap, the upper portion having a shank extending from the beam, the shank positioned between first and second upper faces adjacent to a periphery of an upper portion of the bore, the cap having a strap positioned between first and second lower faces adjacent to a periphery of a lower portion of the bore; the big end having a specified cross-sectional profile with a lower face height being a function of a upper face height, a lower face-to-face width, a strap height, and a strap width;
    an upper bearing shell received by the upper portion of the bore, and a lower bearing shell received by the lower portion of the bore; and
    first and second fasteners connecting the cap to the upper portion of the big end at a specified load;
    wherein the specified cross-sectional profile of the big end is configured to deform each bearing shell from a freeform uniform cross-section to a convex axial profile cross-section in response to securing the cap to the upper portion of the big end with a predetermined load, the convex axial profile cross-section having an inner face with a central region being at least one micrometer higher than edge regions of the inner face.

11. The connecting rod of claim 10 wherein the function between the lower face height (G), the strap width (E), and the face-to-face width (C) is: 0.2 C<G<E<0.6 C;
    wherein the function between the lower face height (G) and the upper face height (D) is: D<0.8 G; and
    wherein the function between the lower face height (G) and the strap height (F) is: 0.2 F<G<0.5 F.

12. The connecting rod of claim 10 wherein the function between the lower face height (G), the strap width (E), and the face-to-face width (C) is: 0.2 C<G<E<0.6 C.

13. The connecting rod of claim 10 wherein the function between the lower face height (G) and the upper face height (D) is: D<0.8 G.

14. The connecting rod of claim 10 wherein the function between the lower face height (G) and the strap height (F) is: 0.2 F<G<0.5 F.

15. The connecting rod of claim 10 wherein the bore of the big end is formed by a cylinder having a first radius; and wherein each of the upper and lower bearing shells has a second radius greater than the first radius in an unloaded state.

16. An engine comprising:
    a connecting rod having a big end dimensioned with a lower face height as a function of an upper face height, a face-to-face width, and a strap height and width;

first and second bearing shells received by the big end under a specified clamp load and deformed into a convex axial profile in response to the big end dimensions; and a crankshaft having a crank pin interfacing with the convex axial profile.

17. The engine of claim 16 wherein the crank pin has a cylindrical outer journal surface to interface with the convex axial profile of each of the upper and lower bearing shells.

18. The engine of claim 16 wherein each of the first and second bearing shells has a free state with a straight axial profile and uniform cross-section.

19. The engine of claim 16 wherein the function between the lower face height (G), the strap width (E), and the face-to-face width (C) is: 0.2 C<G<E<0.6 C;

wherein the function between the lower face height (G) and the upper face height (D) is: D<0.8 G; and wherein the function between the lower face height (G) and the strap height (F) is: 0.2 F<G<0.5 F.

\* \* \* \* \*